(12) United States Patent
Lubbers et al.

(10) Patent No.: US 9,329,800 B2
(45) Date of Patent: May 3, 2016

(54) PREFERRED ZONE SCHEDULING

(75) Inventors: Clark Edward Lubbers, Colorado Springs, CO (US); Robert Michael Lester, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1184 days.

(21) Appl. No.: 11/771,980

(22) Filed: Jun. 29, 2007

(65) Prior Publication Data
US 2009/0006741 A1    Jan. 1, 2009

(51) Int. Cl.
*G06F 12/02* (2006.01)
*G06F 3/06* (2006.01)
*G06F 11/34* (2006.01)
*G06F 12/08* (2016.01)

(52) U.S. Cl.
CPC ............ *G06F 3/0665* (2013.01); *G06F 3/0605* (2013.01); *G06F 3/067* (2013.01); *G06F 3/0617* (2013.01); *G06F 3/0619* (2013.01); *G06F 3/0653* (2013.01); *G06F 3/0659* (2013.01); *G06F 11/3433* (2013.01); *G06F 11/3485* (2013.01); *G06F 12/0866* (2013.01); *G06F 2201/87* (2013.01); *G06F 2201/88* (2013.01); *G06F 2201/885* (2013.01)

(58) Field of Classification Search
CPC ............ G06F 11/3433; G06F 11/3485; G06F 12/0866; G06F 2201/87; G06F 2201/88; G06F 2201/885; G06F 3/0605; G06F 3/0617; G06F 3/0619; G06F 3/0653; G06F 3/0659; G06F 3/0665; G06F 3/067

USPC .................................................. 711/142, 143
See application file for complete search history.

(56) References Cited

U.S. PATENT DOCUMENTS

| | | | |
|---|---|---|---|
| 5,522,057 A * | 5/1996 | Lichy | 711/144 |
| 5,740,465 A * | 4/1998 | Matsunami et al. | 710/5 |
| 6,389,508 B1 * | 5/2002 | Tamura | G06F 3/061 711/112 |
| 6,460,122 B1 * | 10/2002 | Otterness et al. | 711/154 |
| 6,629,211 B2 | 9/2003 | McKnight | |
| 6,782,449 B1 * | 8/2004 | Codilian | G06F 12/0862 360/99.2 |
| 7,133,291 B2 * | 11/2006 | Carlson et al. | 361/727 |
| 7,177,145 B2 * | 2/2007 | Carlson et al. | 361/679.32 |
| 2002/0156972 A1 * | 10/2002 | McKnight et al. | 711/114 |

(Continued)

OTHER PUBLICATIONS

"WOW: wise ordering for writes—combining spatial and temporal locality in non-volatile caches"; Gill et al.; Proceedings of the 4th conference on USENIX Conference on File and Storage Technologies; USENIX Association; Dec. 13-16, 2005.*

(Continued)

*Primary Examiner* — Yaima Rigol
(74) *Attorney, Agent, or Firm* — Hall Estill Attorneys at Law (57) ABSTRACT

A data storage system and associated method are provided wherein a policy engine continuously collects qualitative information about a network load to the data storage system in order to dynamically characterize the load and continuously correlates the load characterization to the content of a command queue of transfer requests for writeback commands and host read commands, selectively limiting the content with respect to writeback commands to only those transfer requests for writeback data that are selected on a physical zone basis of a plurality of predefined physical zones of a storage media.

18 Claims, 8 Drawing Sheets

(56) References Cited

U.S. PATENT DOCUMENTS

| | | | |
|---|---|---|---|
| 2005/0076115 A1* | 4/2005 | Andrews et al. | 709/224 |
| 2005/0149940 A1* | 7/2005 | Calinescu et al. | 718/104 |
| 2005/0193167 A1* | 9/2005 | Eguchi et al. | 711/114 |
| 2005/0223163 A1* | 10/2005 | Ogasawara et al. | 711/112 |
| 2006/0015688 A1* | 1/2006 | Schnapp et al. | 711/142 |
| 2006/0143396 A1* | 6/2006 | Cabot | 711/134 |
| 2006/0236033 A1* | 10/2006 | Guinn et al. | 711/118 |
| 2006/0253621 A1* | 11/2006 | Brewer et al. | 710/40 |
| 2006/0294118 A1* | 12/2006 | Lubbers et al. | 707/100 |
| 2007/0168610 A1* | 7/2007 | Kobayshi | G06F 3/061 711/114 |
| 2009/0055587 A1* | 2/2009 | Kellar | 711/118 |

OTHER PUBLICATIONS

"WOW: wise ordering for writes—combining spatial and temporal locality in non-volatile caches"; Gill et al.; Proceedings of the 4th conference on USENIX Conference on File and Storage Technologies; USENIX Association; Dec. 13-16, 2005*

Computer Architecture: a Quantitative Approach, 3rd Edition; Hennessy et al.; Morgan Kaufmann Publishers; 2003; pp. 401.*

The Cache Memory Book, 2nd Edition; Handy, Jim; Academic Press; 1993; p. 64-65.*

Variables (1 of 2); www.davidmlane.com; published May 6, 2006; retrieved Apr. 6, 2010.*

* cited by examiner

PREFERRED ZONE SCHEDULING

Embodiments of the present invention relate generally to the field of data storage systems and more particularly, but not by way of limitation, to an apparatus and method for adaptively managing seek command profiles in a distributed array storage system.

BACKGROUND

Computer networking began proliferating when the data transfer rates of industry standard architectures could not keep pace with the data access rate of the 80386 processor made by Intel Corporation. Local area networks (LANs) evolved to storage area networks (SANs) by consolidating the data storage capacity in the network. Users have realized significant benefits by the consolidation of equipment and the associated data handled by the equipment in SANs, such as the capability of handling an order of magnitude more storage than would otherwise be possible with direct attached storage, and doing so at manageable costs.

More recently the movement has been toward a network-centric approach to controlling the data storage subsystems. That is, in the same way that the storage was consolidated, so too are the systems that control the functionality of the storage being offloaded from the servers and into the network itself. Host-based software, for example, can delegate maintenance and management tasks to intelligent switches or to a specialized network storage services platform. Appliance-based solutions eliminate the need for the software running in the hosts, and operate within computers placed as a node in the enterprise. In any event, the intelligent network solutions can centralize such things as storage allocation routines, backup routines, and fault tolerance schemes independently of the hosts.

While moving the intelligence from the hosts to the network resolves some problems such as these, it does not resolve the inherent difficulties associated with the general lack of flexibility in altering the presentation of virtual storage to the hosts. For example, the manner of storing data may need to be adapted to accommodate bursts of unusual host load activity. What is needed is an intelligent data storage subsystem that self-deterministically allocates, manages, and protects its respective data storage capacity and presents that capacity as a virtual storage space to the network to accommodate global storage requirements. This virtual storage space is able to be provisioned into multiple storage volumes. It is to this solution that embodiments of the present invention are directed.

SUMMARY OF THE INVENTION

Embodiments of the present invention are generally directed to optimizing the flushing performance of dirty data by selectively deriving the content of a command queue under burst load conditions.

In some embodiments a data storage system and associated method are provided wherein a policy engine continuously collects qualitative information about a network load to the data storage system in order to dynamically characterize the load and continuously correlates the load characterization to the content of a command queue which is derived from data transfer requests for cached writeback data and host read commands, limiting the content to only those transfer requests for writeback data that are selected on a zone basis of a plurality of predefined zones of a storage media.

These and various other features and advantages which characterize the claimed invention will become apparent upon reading the following detailed description and upon reviewing the associated drawings.

DETAILED DESCRIPTION

Figure 1:
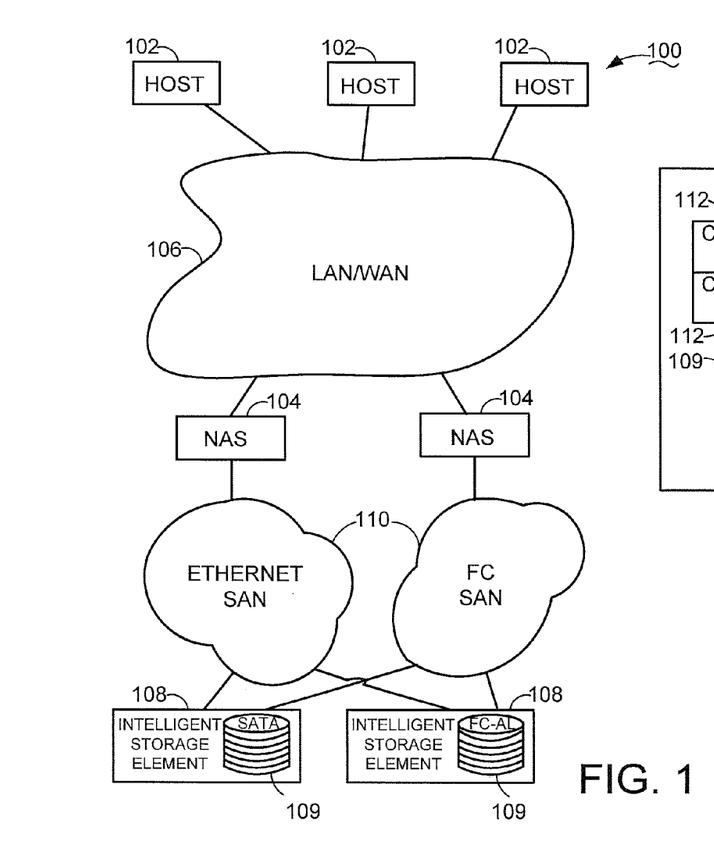
FIG. 1 is a diagrammatic representation of a computer system incorporating embodiments of the present invention.

FIG. 1 is an illustrative computer system 100 incorporating embodiments of the present invention. One or more hosts 102 are networked to one or more network-attached servers 104 via a local area network (LAN) and/or wide area network (WAN) 106. Preferably, the LAN/WAN 106 uses Internet protocol (IP) networking infrastructure for communicating over the World Wide Web. The hosts 102 access applications resident in the servers 104 that routinely need data stored on one or more of a number of intelligent storage elements (ISE) 108. Accordingly, SANs 110 connect the servers 104 to the ISEs 108 for access to the stored data. The ISEs 108 provide a data storage capacity 109 for storing the data over various selected communication protocols such as serial ATA and fibre-channel, with enterprise or desktop class storage medium within.

Figure 2:
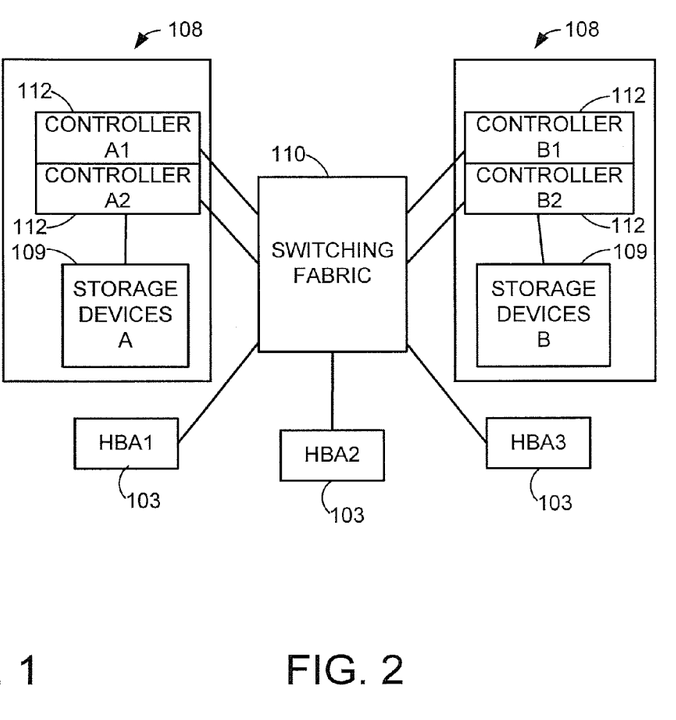
FIG. 2 is a simplified diagrammatic representation of a portion of the computer system of FIG. 1.

FIG. 2 is a simplified diagrammatic view of part of the computer system 100 of FIG. 1. Three host bus adapters (HBA) 103 are depicted interacting with a pair of the ISEs 108 (denoted A and B, respectively) via the network or fabric 110. Each ISE 108 includes dual redundant controllers 112 (denoted A1, A2 and B1, B2) preferably operating on the data storage capacity 109 as a set of data storage devices characterized as a redundant array of independent drives (RAID). That is, the controllers 112 and data storage capacity 109 preferably utilize a fault tolerant arrangement so that the various controllers 112 utilize parallel, redundant links and at least some of the user data stored by the system 100 is stored in redundant format within at least one set of the data storage capacities 109.

Figure 3:
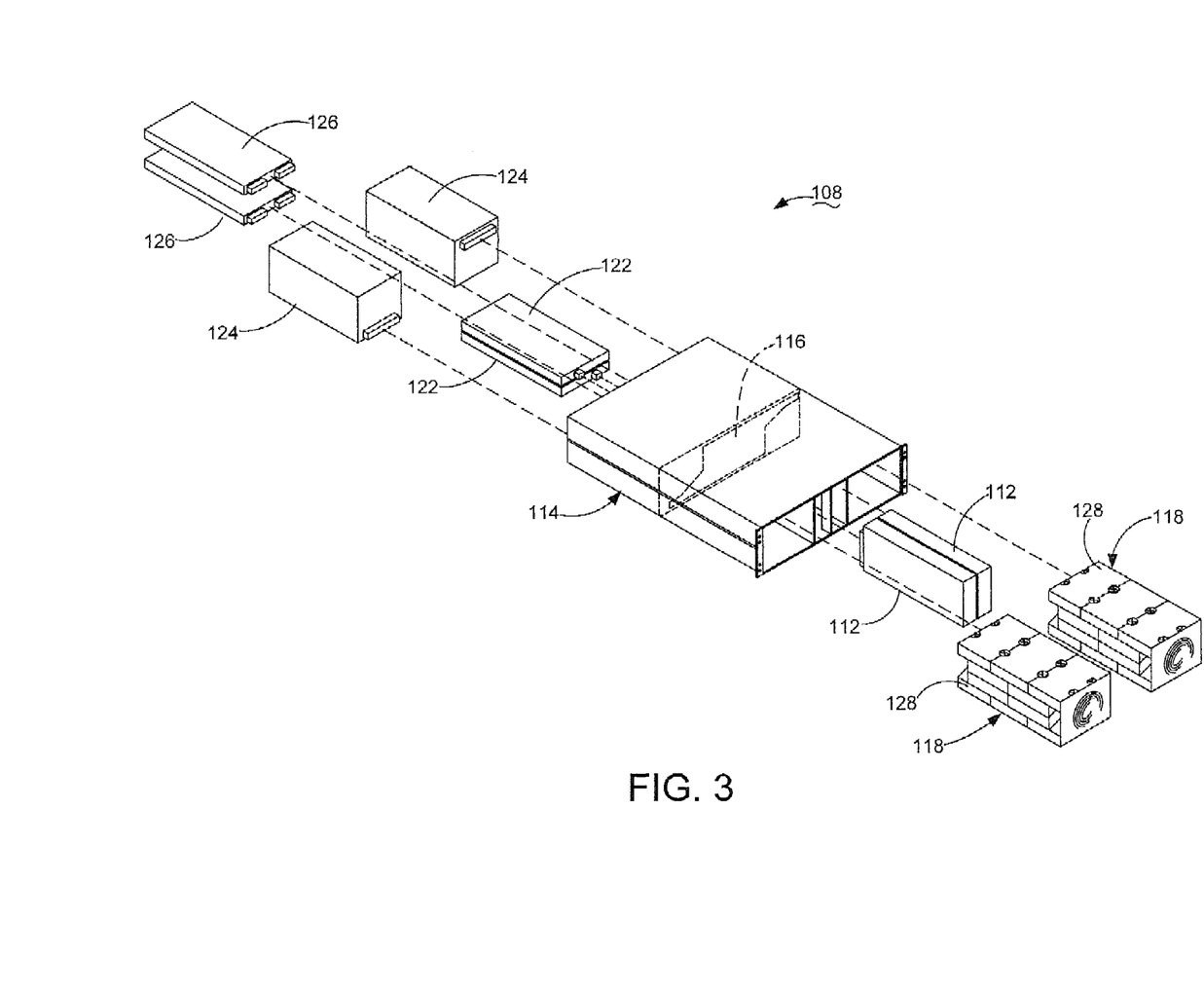
FIG. 3 is an exploded isometric view of an intelligent storage element constructed in accordance with embodiments of the present invention.

FIG. 3 illustrates an ISE 108 constructed in accordance with illustrative embodiments of the present invention. A shelf 114 defines cavities for receivingly engaging the controllers 112 in electrical connection with a midplane 116. The shelf 114 is supported, in turn, within a cabinet (not shown). A pair of multiple drive assemblies (MDAs) 118 are receivingly engageable in the shelf 114 on the same side of the midplane 116. Connected to the opposing side of the midplane 116 are dual batteries 122 providing an emergency power supply, dual alternating current power supplies 124, and dual interface modules 126. Preferably, the dual components are configured for operating either of the MDAs 118 or both simultaneously, thereby providing backup protection in the event of a component failure.

Figure 4:
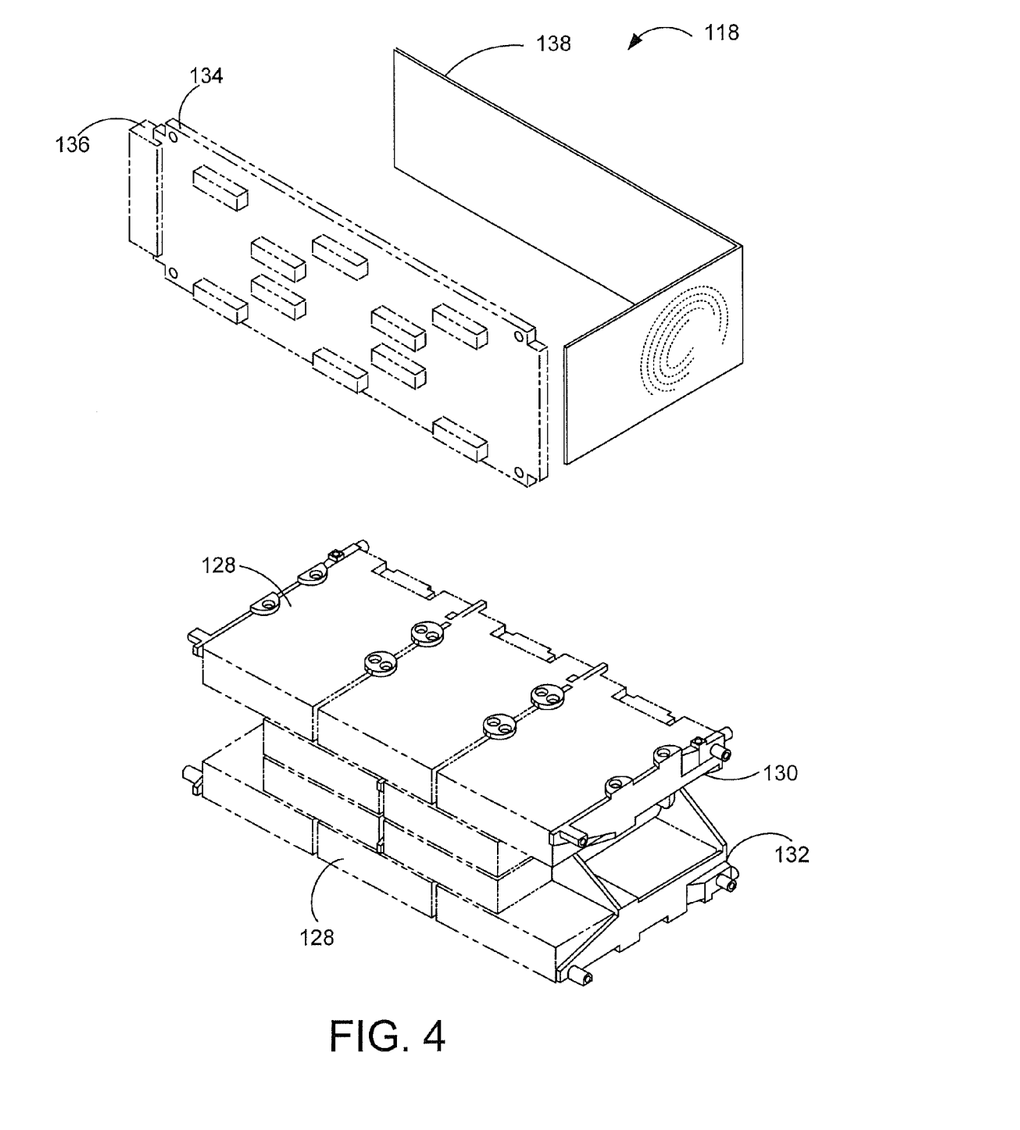
FIG. 4 is an exploded isometric view of a multiple drive array of the intelligent storage element of FIG. 3.

FIG. 4 is an enlarged exploded isometric view of the MDA 118 which has an upper partition 130 and a lower partition 132, each supporting five data storage devices 128. The partitions 130, 132 align the data storage devices 128 for connection with a common circuit board 134 having a connector 136 that operably engages the midplane 116 (FIG. 3). A wrapper 138 provides electromagnetic interference shielding. This illustrative embodiment of the MDA 118 is the subject matter of U.S. Pat. No. 7,133,291 entitled Carrier Device and Method for a Multiple Disc Array which is assigned to the assignee of the present invention and incorporated herein by reference. Another illustrative embodiment of the MDA 118 is the subject matter of U.S. Pat. No. 7,177,145 of the same title which is also assigned to the assignee of the present invention and incorporated herein by reference. In alternative equivalent embodiments the MDA 118 can be provided within a sealed enclosure.

Figure 5:
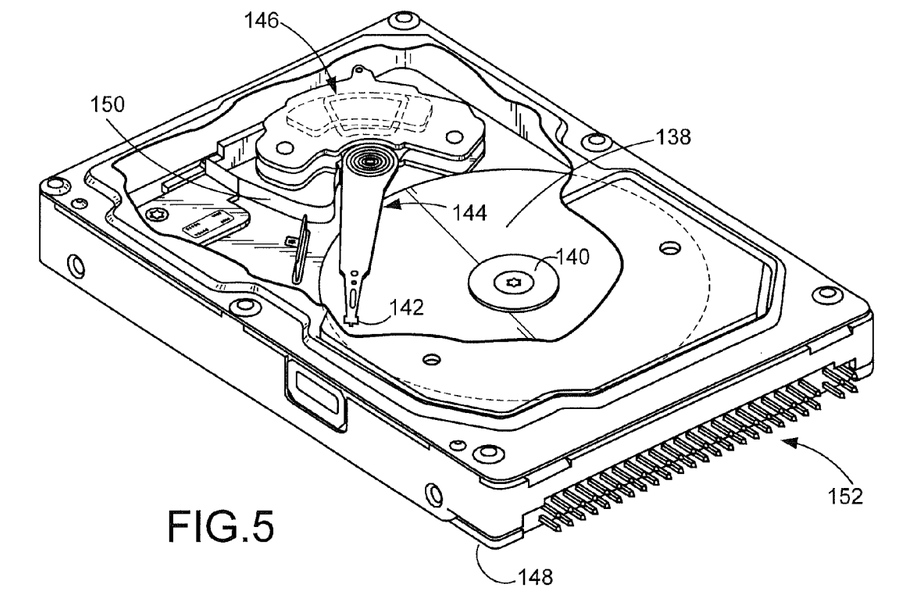
FIG. 5 is an exemplary data storage device used in the multiple drive array of FIG. 4.

FIG. 5 is an isometric view of the data storage device 128 suited for use with embodiments of the present invention and in the form of a rotating media disc drive. Although a rotating spindle with moving data storage medium is used for discussion purposes below, in alternative equivalent embodiments a non-rotating medium device, such as a solid state memory device is used. In the illustrative embodiments of FIG. 5 a data storage disc 138 is rotated by a motor 140 to present data storage locations of the disc 138 to a read/write head ("head") 142. The head 142 is supported at the distal end of a rotary actuator 144 that is responsive to a voice coil motor (VCM) 146 in moving the head 142 radially between inner and outer tracks of the disc 138. The head 142 is electrically connected to a circuit board 148 by way of a flex circuit 150. The circuit board 148 is adapted to receive and send control signals controlling the functions of the data storage device 128. A connector 152 is electrically connected to the circuit board 148, and is adapted for connecting the data storage device 128 with the circuit board 134 (FIG. 4) of the MDA 118.

Figure 6:
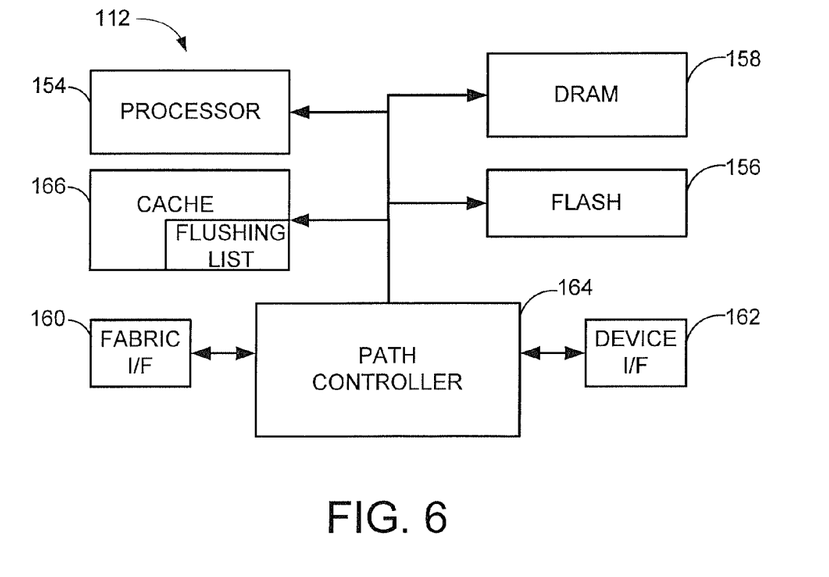
FIG. 6 is a functional block diagram of the array controller of the intelligent storage element.

FIG. 6 diagrammatically depicts one of the controllers 112. The controller 112 can be embodied in a single integrated circuit, or distributed among a number of discrete circuits as desired. A processor 154, preferably characterized as a programmable computer processor, provides control in accordance with programming steps and processing data preferably stored in non-volatile memory 156 (such as flash memory or similar) and in dynamic random access memory (DRAM) 158.

A fabric interface (I/F) circuit 160 communicates with the other controllers 112 and the HBAs 103 via the fabric 110, and a device I/F circuit 162 communicates with the storage devices 128. The I/F circuits 160, 162 and a path controller 164 form a communication path to pass commands and data between network devices and the ISE 108 via the HBAs 103, such as by employing the cache 166. Although illustrated discretely, it will be understood that the path controller 164 and the I/F circuits 160, 162 can be unitarily constructed.

Preferably, in order to increase host processing performance, write commands to virtual blocks are writeback cached in the cache 166 and held as pending therein until a cache manager activates flushing activities for particular subsets of write commands by requesting RAID container services (RCS) to flush virtual blocks to the storage devices 128. RCS executes algorithms that pass requests to perform specific data transfers to seek managers in order to effect the update of media in accordance with RAID algorithms that reliably update media. A seek manager manages a command queue for a specific storage device 128 to, in effect, grant permissions to issue data transfer requests which are derived from cached writeback commands and higher priority host read commands. The seek manager allocates resources for performing the associated data transfers that, in effect, grants permissions to issue the transfer requests.

The data storage capacity of an ISE 108 is organized into logical devices that are referenced when storing data to and retrieving data from the storage devices 128. System configuration information defines the relationship between user data as well as any associated parity and mirror data and the respective storage locations. The system configuration information furthermore identifies the relationship between blocks of storage capacity allocated to data and the associated memory storage locations, such as in terms of logical block addresses (LBA). The system configuration information can furthermore include virtualization by defining virtual block addresses that are mapped to logical block addresses.

The controller 112 architecture advantageously provides scalable, highly functional data management and control of the storage capacity. Preferably, stripe buffer lists (SBLs) and other metadata structures are aligned to stripe boundaries on the storage media and reference data buffers in cache 166 that are dedicated to storing the data associated with a disk stripe during a storage transaction.

During operation, the cache 166 will store user data and other information associated with I/O transfers through the HBAs 103 via the SAN 110. Readback data retrieved from the storage devices 128, including non-requested speculative data, may be retained for a time in the cache 166 in hopes of a subsequent "cache hit," so that the subsequently requested data are forwarded directly from the cache 166 instead of requiring the scheduling of an access command directed to the storage devices 128. Similarly, a write-back cache policy is employed so that data to be written to the storage devices 128 is cached, a completion acknowledgement is sent back to the initiating network device via the HBA 103, but the actual writing of the data to the storage device 128 is scheduled at a later convenient time.

It is thus generally necessary for the controller 112 to maintain accurate control of the contents of the cache 166, including tracking the status of each entry. Such control is preferably carried out by way of a skip list arrangement which utilizes an address related table structure. The skip list is preferably maintained in a portion of the cache 166, although other memory spaces can be utilized as desired.

Figure 7:
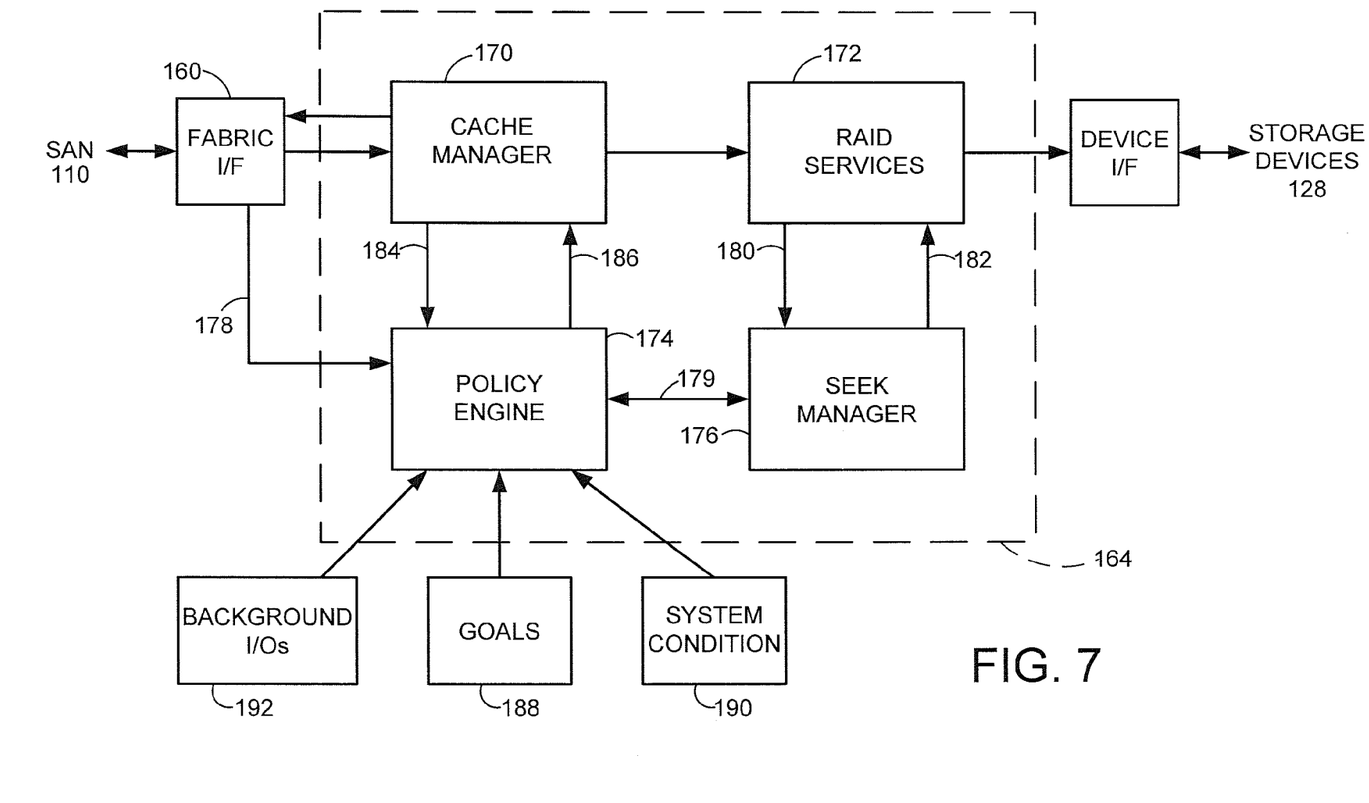
FIG. 7 is a functional block diagram of portions of the array controller of FIG. 6.

FIG. 7 is a functional block diagram depicting a cache manager 170, a RAID container services 172, a policy engine 174, and a seek manager 176 that reside in the path controller 164 (FIG. 6). Although only one seek manager 176 is depicted, there is a dedicated seek manager 176 for each storage device 128 so that they are individually responsive to seek rules from the policy engine 174.

These functional blocks can implemented in software or hardware, in the latter such as but not limited to the policy engine 174 being a finite state machine. In any event, the policy engine 174 continuously collects qualitative data about access commands received via the fabric I/F 160 on an I/O by I/O basis via path 178. The policy engine 174 dynamically characterizes the network load and consequently issues seek rules via path 179 that govern the seek manager 176 which, in turn, queries a command queue of data transfer requests derived from requests to transfer write back data and host read requests via path 180 and selectively grants permissions to issue data transfer requests via path 182 to define a command profile.

The policy engine 174 can be responsive to performance goals 188 in formulating rules for the seek manager 176. The goals 188 can be quantitative or qualitative, such as but not limited to enforcing a desired command profile that is some factor of the network load in terms of the ratio of latency sensitive commands to rate sensitive commands (ratio of read to write commands for write back caching), enforcing assigned priorities to different LUN classes, enforcing a desired read command latency. The policy engine 174 can also collect qualitative data characterizing the host load in other terms such as but not limited to size (bandwidth).

In addition, the policy engine 174 can be responsive to system condition information 190 in formulating rules governing the seek manager 176. For example, without limitation, a power supply indicator may inform the policy manager 174 that the ISE 108 has switched to a battery backup power source. In this condition the policy manager 174 will likely implement contingencies to aggressively flush the cache 166 with respect to the projected limited power availability. The policy engine 174 can also be responsive to the state of pending background I/Os 192, or I/Os not directly involved with access command data transfers, in formulating the seek rules governing the seek manager 176 in adjusting the command profile to the storage devices 128.

The policy engine 174 thus can use any combination of the load characterization, the goals 188, the system condition 190, and the background I/Os to define seek rules governing the seek manager 176 for issuing a selected data transfer request from a plurality of data transfers in the command queue of data transfers derived from cached writeback commands and higher priority host read commands.

In an illustrative example the policy engine characterizes the network load in terms of the ratio of rate sensitive commands to latency sensitive commands. For purposes of the present description a write back caching scheme is presumed. Thus, write back cache commands are considered to be rate sensitive commands because it does not matter so much which requests are flushed to the data storage devices 128 at any point in time. In fact, rate sensitive requests may even be overwritten while pending in cache 166 as dirty data. What matters is that rate sensitive commands get flushed at a rate that prevents the cache 166 from reaching saturation.

On the other hand, an access command to read data that is stored in one or more of the data storage devices 128 will likely cause the network application to block further processing until the access command is satisfied. The time it takes to satisfy the access command, the latency period, is critical to the performance of the application. Such commands are thereby referred to as the latency sensitive commands. In certain circumstances the host can opt to not authorize write back caching. In that case a write command, called a writethrough cache command, is likewise categorized as a latency sensitive command.

In collecting qualitative data the policy engine 174 preferably tallies counts during each of a predetermined sample interval, such as but not limited to each one-second interval. For collecting data on the ratio of read commands to write commands, for example, a free running counter can be set with a pointer moving the index on one-second boundaries to continuously track the ratio. The counter holds a desired number of previously observed ratios, such as the previous 8 one-second sample ratios, with a ninth slot for tallying the current one-second ratio. On the one-second boundaries the index cycles, subtracts the indexed historical value and adds the latest sample value, then divides by 8 to calculate the most recent running average of the ratio.

Staying with the illustrative example, when the policy engine 174 observes that a host load burst activity is occurring it can issue rules governing the seek manager 176 to modify the command profile in relation to the network load in an effort to prevent a saturation condition in the cache 166. The rules may cause the command profile to match the network load in terms of the ratio of write commands (rate sensitive) to read commands (latency sensitive). The rules may also modify or even temporarily suspend other goals such as the maximum latency and the LUN class priority in order to recover from saturation as quickly and smoothly as possible.

In conditions like this when emphasis is put to the seek manager 176 to aggressively flush write commands, it has been determined that flushing performance can be significantly improved by altering the function of the cache manager 170 in relation to the load characterization to more particularly derive the transfer requests in the command queue to only those that lie in a selected physical zone of a plurality of physical zones of the disc 138 (FIG. 5) in the storage device 128.

Figure 8:
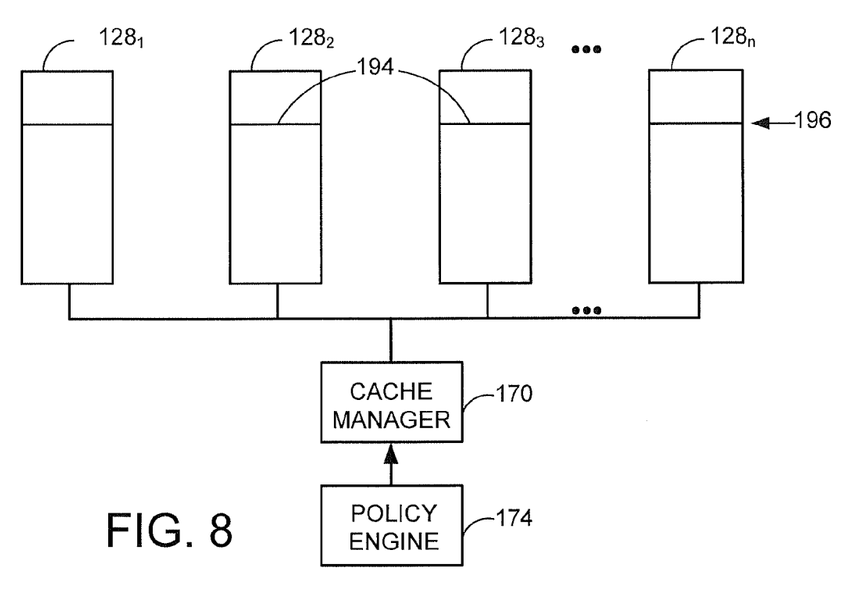
FIG. 8 diagrammatically depicts portions of the array controller and an array of data storage devices in the intelligent storage element.

FIG. 8 diagrammatically depicts the cache manager 170 managing the cache 166 (FIG. 6) on a node basis using a data structure referred to as a stripe data descriptor (SDD). Each SDD holds data concerning recent and current accesses to the data with which it is associated. Each SDD also preferably includes variables that indicate various states of the data, including access history, locked status, last offset, last block, timestamp data (time of day, TOD), identifiers to which zone (book) the data belong, and RAID level employed. Preferably, writeback ("dirty") data status of the data associated with the SDD is managed in relation to dirty data, dirty buffer, dirty LRU and flushing LRU values.

Each SDD preferably aligns to a corresponding RAID stripe 194 (i.e., all of the data on a selected storage device 128 associated with a particular parity set), and conforms to a particular stripe buffer list (SBL). Each cache node preferably references some particular SDD, with active SDD structures for a given set of logical discs being preferably linked in ascending order via a virtual block address (VBA) using forward and backward linked lists.

Preferably, the VBA values are aligned with the RAID data organization using a grid system sometimes referred to as a RAID Allocation Grid System (RAGS). Generally, any particular collection of blocks belonging to the same RAID strip 196 (e.g., all of the data contributing to a particular parity set) will be assigned to a particular reliable storage unit (RSU) on a particular sheet. A book consists of a number of sheets and is constructed from multiple contiguous sets of blocks from different storage devices 128. Based on the actual sheet and VBA, the books can be further sub-divided into zones, indicating the particular device or device set (when redundancy is employed).

Preferably, the cache manager 170 manages the writeback commands and host read commands adaptively in order to process them as efficiently as possible. Any SDD with dirty blocks and no locked blocks are preferably set as dirty and sorted by age (e.g., time the data has spent in the cache waiting flushing). Once a particular aging is reached, the flushing LRU variable can be set and the flushing list is updated.

Figure 9:
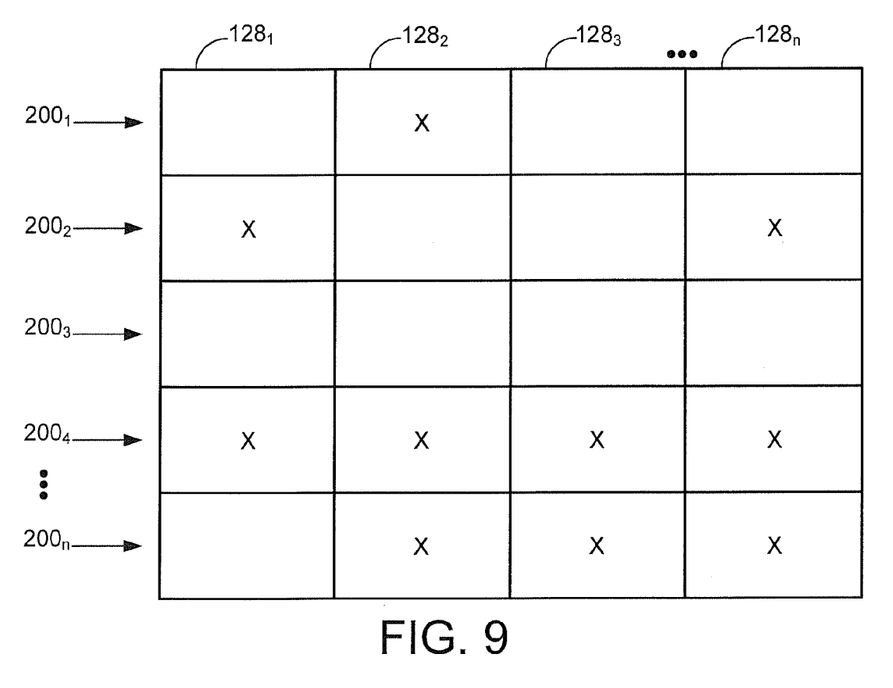
FIG. 9 depicts an array used by the cache manager in randomly mapping writeback data requests.

FIG. 9 depicts an array 200 of transfer requests in the command queue. They are mapped by cells defined by the intersection of a book 200 of storage capacity and the storage devices 128 in which the book 200 exists. The cells are populated by the transfer requests, such that those cells denoted with an "X" indicate those locations where one or more transfer requests are pending. The array 198 is a seek management tool that is used when an access command sends the transducer 142 (FIG. 5) to a particular location, such as to carry out a read command, other available blocks of writeback data are readily identifiable for servicing in relation to the current location in efforts to short-stroke the actuator 144 (FIG. 5).

Figure 10:
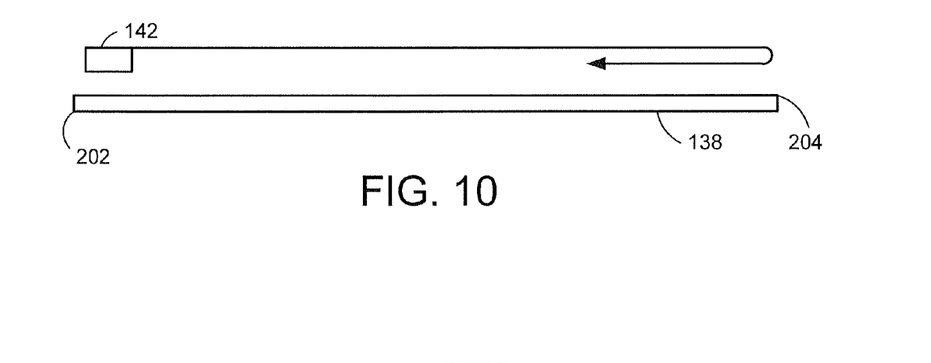
FIG. 10 diagrammatically depicts the storage device issuing writeback data requests in a uniform distribution in conjunction with a CSCAN seek scheduling technique.

Transfer requests for dirty data can be added randomly to the array 198, such that a uniform distribution is presented to the seek manager 176. This uniformly distributed basis for the command queue is well suited for conventional seek scheduling routines, such as the CSCAN and elevator routines, that are preferably employed when the network load is at or below an expected steady state. FIG. 10, for example, depicts how the head 142 is made to continuously traverse the disc 138 radially outward from the inner radius 202 and then radially inward from the outer radius 204, with the seek manager 176 issuing the uniformly distributed transfer requests along the predefined path of travel.

However, in the present embodiments the aggressiveness of flushing data from the command queue is tied to the host load of access commands. That is, not flushing aggressively enough during a relatively high host load can cause the cache 126 to reach saturation. Thus, in conjunction with the policy engine 174 putting an emphasis to the seek manager 174 to match the command profile to the host load characterization during load burst activity with a non-uniform distribution, the policy engine 174 also governs the cache manager 170 to switch to a mode whereby it defines the command queue on a physical zone distribution basis rather than the uniformly distributed basis.

Figure 11:
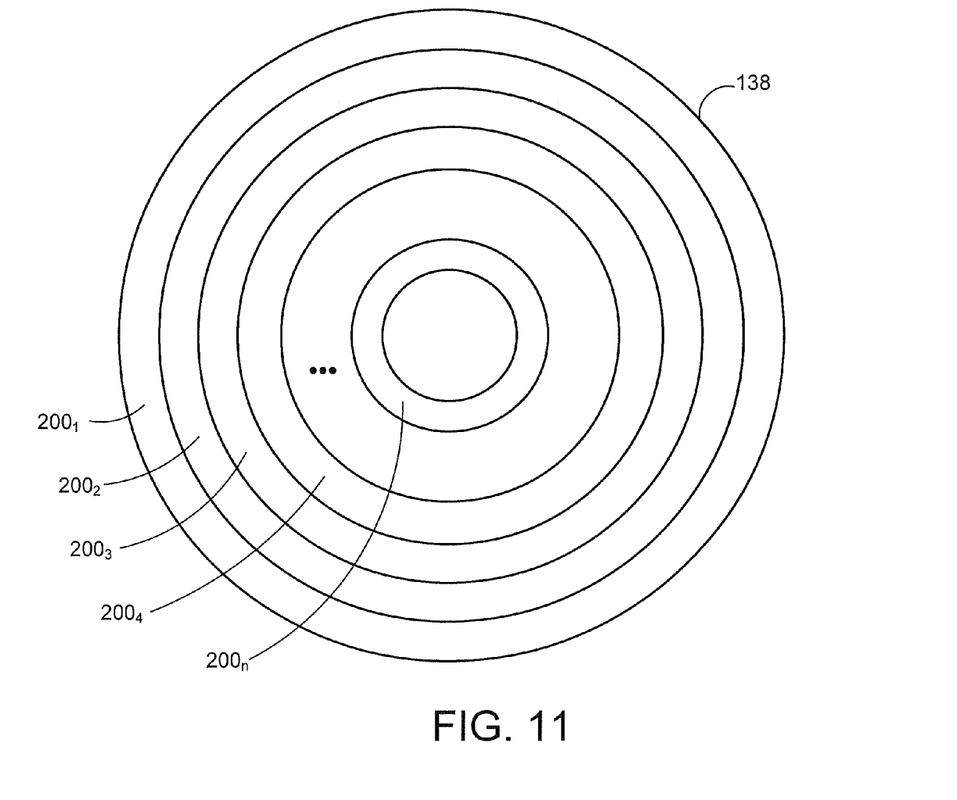
FIG. 11 is a diagrammatic plan view of the storage device disc depicting annular zones defined by books of data storage capacity.
Figure 12:
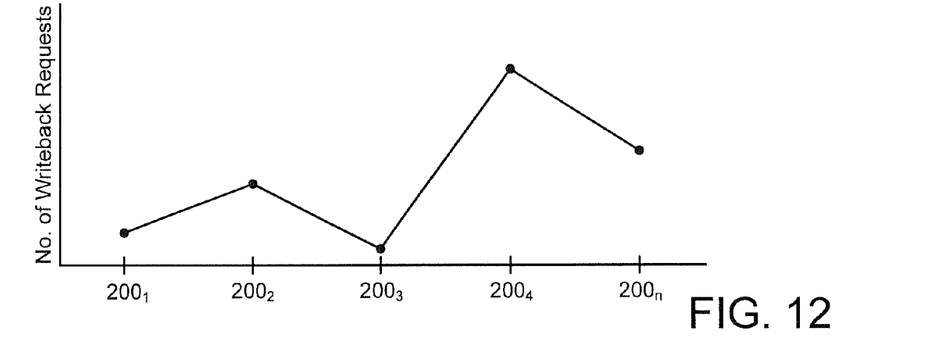
FIG. 12 depicts observed counts of writeback requests in each of the books of FIG. 11.

FIG. 11 depicts one of the discs 138 of a storage device 128 making up the array 198 of FIG. 9. This disc 138 and all the other discs 138 of those storage devices 128 are demarcated into annular zones defined by the books 200 of storage capacity. FIG. 12 depicts an example of numbers of transfer requests for writeback data currently pending within each book 200. In accordance with the present embodiments, the policy engine 174 selectively governs the cache manager 170 to select the book 200 with the largest number of pending writeback requests, in this case book 200₄, and limit the command queue content to only those writeback requests within that book 200₄. In some embodiments the cache manager 170 can be so constrained to a leading book 200 until all writeback requests are issued from that book 200. In other embodiments the cache manager 170 can reevaluate the distribution of writeback requests periodically, and if a different book 200 has a significantly larger number of writeback requests then it will shift the command queue content to writeback requests in that leading book 200.

Figure 13:
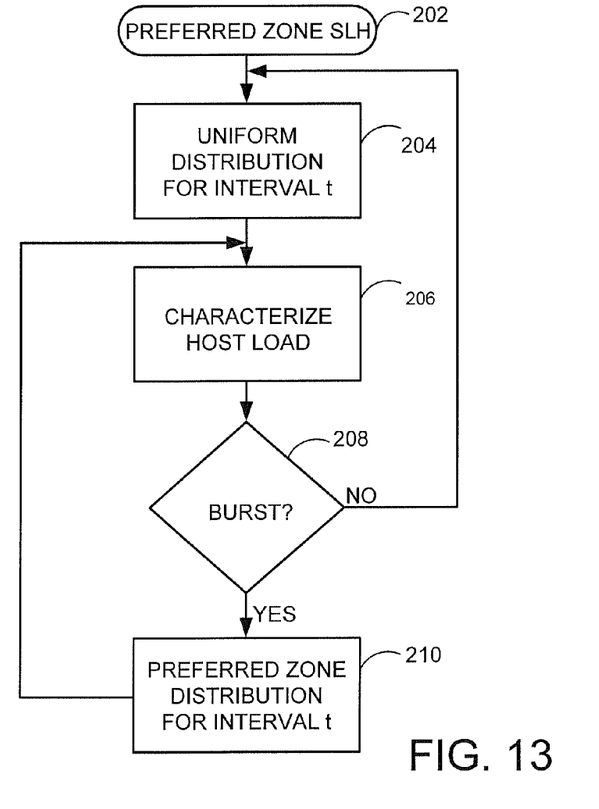
FIG. 13 is a flowchart depicting steps in a method for PREFERRED ZONE SCHEDULING in accordance with embodiments of the present invention.

FIG. 13 is a flowchart depicting steps in a method 202 for PREFERRED ZONE SCHEDULING in accordance with embodiments of the present invention. The method 202 begins in block 204 with the default mode of loading the command queue with a uniform distribution of transfer requests for writeback commands and host read commands. The default mode is implemented for a predefined interval, such as but not limited to for a one-second interval, during which the policy engine collects data regarding the network load. The latest data is used in block 206 to dynamically characterize the host load, such as in terms of the read to write ratio and I/O rate.

In block 208 the policy engine determines whether a burst of I/O commands with a non-uniform distribution are evident from monitoring the network load. If the determination of block 208 is no, then control returns to block 204 so that default conditions persist. If, however, the determination of block 208 is yes, then in block 210 the policy engine uses the characterization of the host load, and perhaps the goals 188, system condition 190 and background I/Os 192, to invoke preferred zone scheduling rules in order to continuously make adjustments in deriving the command profile. For example, without limitation, if a high write command to read command ratio is occurring in a saturated state then the policy engine can govern the cache manager to match the content of the command queue to the host load in terms of the write to read ratio until recovery from saturation is achieved. The policy engine might even modify or even temporarily suspend other rules such as read latency and LUN class priority goals in order to recover from saturation as quickly and as smoothly as possible. The preferred zone scheduling rules are invoked for the predetermined interval, such as a one-second interval, during which the next batch of load data is collected and then control returns to block 206.

Generally, the present embodiments contemplate a storage array configured for connecting to a network to transfer data in response to network access commands, and means for deriving a command queue by correlating a distribution of the transfer requests in the command queue to an observed characterization of a network load of access commands. For purposes of this description and meaning of the appended claims the phrase "means for deriving" expressly includes the structure disclosed herein and equivalents thereof that permit the controller 112 to characterize the network load and directly adjust the content of the command queue according to the characterization. By "directly" adjusting the flushing list the "means for deriving" expressly contemplates the cache manager responsively switching the content, such as from a uniform distribution to a zone distribution, in relation to the characterization of the network load and rules from the policy engine. For purposes of this description and meaning of the appended claims "means for deriving" does not contemplate merely the coincidental locations of writeback data and their occurrence, such as point of sale transactions that result in periods of highly localized burst activity that might indirectly affect the content of the command queue.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed:

1. A data storage system comprising:
   a data storage media having a plurality of zones, each zone allocated to store a book of data; and
   a nontransitory, tangible computer memory having computer instructions configured to execute a preferred zone scheduling routine that continuously collects qualitative information about a network load to the data storage system in order to dynamically characterize the network load, and in response to the network load characterization selectively limits content of a command queue to only transfer requests for a selected book of the plurality of books;
   wherein the preferred zone scheduling routine is configured to populate the command queue with transfer requests to a plurality of books when the network load is a substantially uniform distribution of the data storage media, but to populate the command queue with only the transfer requests for the selected book when the network load is a substantially non-uniform distribution of the data storage media.

2. The data storage system of claim 1 wherein the preferred zone scheduling routine is configured to characterize the network load in terms of a ratio of rate sensitive transfer requests to latency sensitive transfer requests.

3. The data storage system of claim 2 wherein the rate sensitive transfer requests are for write back cache commands and the latency sensitive transfer requests are for at least one of read commands and write through cache commands.

4. The data storage system of claim 1 wherein the preferred zone scheduling routine is configured to characterize the network load in terms of a bandwidth associated with each transfer request.

5. The data storage system of claim 1 wherein each zone is an annular portion of the data storage media.

6. The data storage system of claim 1 comprising an array of data storage media allocated to define a redundant array of independent devices (RAID), wherein respective zones are allocated stripes of data storage capacity for two or more of the data storage media.

7. The data storage system of claim 1 wherein the preferred zone scheduling routine is configured to selectively issue transfer requests in the command queue to a command profile.

8. The data storage system of claim 7 wherein the preferred zone scheduling routine is configured to define rules responsive to the load characterization and responsive to predefined goals that govern issuing the selected transfer requests to the command profile.

9. The data storage system of claim 8 wherein the preferred zone scheduling routine is configured to characterize the network load in terms of a ratio of rate sensitive transfer requests to latency sensitive transfer requests.

10. The data storage system of claim 7 wherein the preferred zone scheduling routine is configured to characterize the network load in terms of a ratio of rate sensitive commands to latency sensitive commands.

11. The data storage system of claim 7 wherein the preferred zone scheduling routine is configured to selectively populate the command profile responsive to a respective predetermined maximum latency of the transfer requests.

12. The data storage system of claim 7 wherein the preferred zone scheduling routine is configured to selectively populate the command profile responsive to a predetermined prioritization of different LUN classes.

13. The data storage system of claim 1 comprising a finite state machine configured to execute the preferred zone scheduling routine.

14. A method comprising:
    formatting a data storage media to have a plurality of zones, each zone allocated to store a book of data;
    monitoring a network load to the data storage media to continuously collect qualitative information for dynamically characterizing the network load; and
    using the network load characterization to selectively limit contents of a command queue to include only transfer requests for one selected book of the plurality of books;
    wherein the using step comprises populating the command queue with transfer requests to a plurality of books when the network load is a substantially uniform distribution of the data storage media, but to populate the command queue with only the transfer requests for the selected book when the network load is a substantially non-uniform distribution of the data storage media.

15. The method of claim 14 wherein the monitoring step comprises characterizing the network load in terms of a ratio of rate sensitive transfer requests to latency sensitive transfer requests.

16. The method of claim 15 wherein the monitoring step comprises characterizing write back cache commands as rate sensitive transfer requests and characterizing at least one of read commands and writethrough cache commands as being latency sensitive transfer requests.

17. The method of claim 14 wherein the monitoring step comprises characterizing the network load in terms of a bandwidth associated with each transfer request.

18. The method of claim 14 comprising striping a plurality of the books across respective plurality of the data storage media allocated to define a redundant array of independent devices (RAID).

* * * * *